United States Patent [19]

Yamaoka et al.

[11] 3,863,130
[45] Jan. 28, 1975

[54] CHARGING APPARATUS AND METHOD FOR AN ALKALI STORAGE BATTERY

[75] Inventors: Goichi Yamaoka; Kazutoshi Onikubo, both of Okaya, Japan

[73] Assignee: Kabushiki Kaisha Suwa Seikosha, Tokyo, Japan

[22] Filed: Mar. 20, 1973

[21] Appl. No.: 343,119

[52] U.S. Cl. .................................... 320/44, 320/48
[51] Int. Cl. ................................................ H02j 7/02
[58] Field of Search ............................ 320/43–45, 320/6, 9, 14, 39, 48, 2

[56] References Cited
UNITED STATES PATENTS

| | | | |
|---|---|---|---|
| 3,157,870 | 11/1964 | Marino et al. | 320/48 X |
| 3,417,307 | 12/1968 | Kosa et al. | 320/14 X |
| 3,484,659 | 12/1969 | Nagai et al. | 320/2 X |
| 3,564,382 | 2/1971 | King et al. | 320/44 X |

Primary Examiner—J. D. Miller
Assistant Examiner—Robert J. Hickey
Attorney, Agent, or Firm—Eric H. Waters

[57] ABSTRACT

For the rapid charging of an Ni-Cd alkali battery, a power source is connected to a series connection of an electrolytic cell and the battery such that the voltage characteristic of these two elements cancel each other out at the final stage of charging. A voltage stabilizer can be included in the circuit along with indicators which indicate when charging is complete and/or incomplete.

1 Claim, 8 Drawing Figures

CHARGING APPARATUS AND METHOD FOR AN ALKALI STORAGE BATTERY

FIELD OF THE INVENTION

This invention relates to charging methods and apparatus for storage batteries, especially for Ni-Cd alkali storage batteries, and to display circuit structure for indicating the completion or to lack of completion of charging.

BACKGROUND

Conventionally, a Ni-Cd alkali storage battery is charged with a low current for a long time so that gas can be absorbed sufficiently. This prevents the battery from being damaged even if it is charged for a long period after full charging. This long-time low-current procedure is not suitable where charging and discharging must be carried out many times in a day. Thus, when a battery is discharged once, it inconveniently cannot be used without being charged all night. Furthermore, the known process takes such a long time that the time lapse in charging is likely forgotten. Additionally, a storage battery is generally easy to charge excessively, this resulting in deterioration of the battery.

In view of the above, a charging apparatus has been provided to charge more rapidly with a cutting off of the charging current by detecting the voltage during the last stage of charging of, for example, a Ni-Cd alkali storage battery. However, this apparatus costs a lot because it uses a complicated electronic circuit which is required due to the very small change of battery voltage during the last stage of charging. At the same time, temperature change, variation of size of the batteries and electronic parts, and so forth must be strictly controlled. Also, this known apparatus can be utilized only in a limited range such as, for example, only in case several storage batteries are connected in series, because the difference between battery voltages of the first stage and the last stage of charging is as small as 0.2 V – 0.3 V as mentioned above.

According to another method, a device is known which utilizes the forward characteristic of a diode (a P-N junction type), whereby current fed into a storage battery is lowered because the charging current is by-passed through the diode when the voltage of the storage battery reaches a certain voltage. Also in this case, it is necessary to strictly observe the temperature characteristics of the battery and diode. Thus, no apparatus which is satisfactory with respect to charging characteristics is found in this known device.

Moreover, with respect to displaying the completion of the charging of a storage battery, this apparatus has not come into wide use as it is generally high-priced because the completion of charging is difficult to detect as mentioned above.

SUMMARY OF THE INVENTION

It is an object of this invention to provide an original and simple rapid charging circuit free from the above-mentioned defects, and one which displays the completion of charging by using a display element.

A circuit construction according to the invention operates as follows: A high current necessary for short-time charging is applied to an electrolytic cell and a storage battery from the first stage to the last stage of charging. At the last stage of charging, the current applied to the storage battery is lowered to zero or a quite low value by the potential of the charged part (or the series connection of the electrolytic cell and the storage battery) at or near the potential of a power source according to the voltage increase of the electrolytic cell. Thus a Ni-Cd alkali storage battery can be charged in a short time.

Furthermore, incompletion and/or completion of charging can be displayed at the lowest possible cost by using simple electric parts such as a transistor, a lamp or the like due to the phenomenon of voltage increase of the electrolytic cell.

BRIEF DESCRIPTION OF THE DRAWING

In the accompanying drawings which illustrate embodiments of this invention.

DETAILED DESCRIPTION

The principle and circuits of this invention will next be described in detail with reference to the above-mentioned circuit diagrams.

Figure 1:
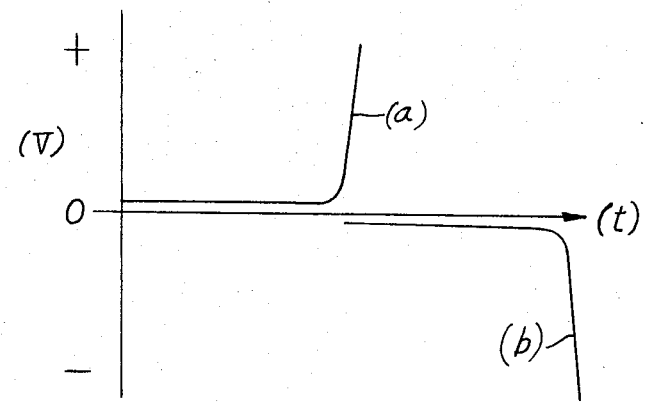
FIG. 1 is a characteristic diagram of an electrolyzer as a circuit part of this invention.

FIG. 1 is a chart which illustrates the chharacteristics of an electrolytic cell which has a voltage increase at the last stage of charging. (V) is the voltage of the electrolyzer, ($t$) is time, ($a$) is the increasing portion of the voltage curve of the electrolytic cell in the case of charging and ($b$) is the portion in the case of discharging. As is shown by this characteristic, although the voltage of the electrolytic cell takes a low value (0.1 – 0.25 V) during most of the charging, the value increases to a high value (1 – 1.5 V) during the last stage of charging and discharging due to voltage change. An example of such electrolytic cell is described, with reference to that of a commercially available coulometer, by the following electrochemical reaction equation.

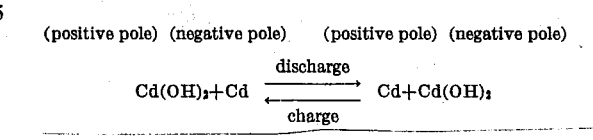

More specifically, if, for example, the positive electrode is cadmium hydroxide [$Cd(OH)_2$] and the negative electrode is metallic cadmium [$Cd$] for charging, the positive electrode becomes metallic cadmium [$Cd$] and the negative electrode becomes cadmium hydroxide [$Cd(OH)_2$] when discharging. Here, caustic potash [$KOH$] in the electrolyte never reacts with the electrode directly but serves in helping movement of the hydroxyl [OH] from the positive pole to the negative pole during discharging, and from the negative pole to the positive pole during charging. Accordingly, the voltage of the electrolytic cell increases at the last stage of charging of the storage battery if an electrolytic cell possessed of the same capacitance as the storage battery is utilized. Also, it is characteristic of this case that no inconvenience due to temperature characteristics occurs due to there being almost the same temperature characteristic as the storage battery.

Furthermore, this electrolyzer is constructed in such a way that a positive plate of a Ni-Cd storage battery is replaced with a negative plate so that two negative Cd plates are used. Both plates are prepared by sintering methods and a separator is inserted therebetween. The electrolyte is a 30 percent solution of calcium hydroxide and is properly supplied to moisten the inner electrodes and the separator.

Figure 2:
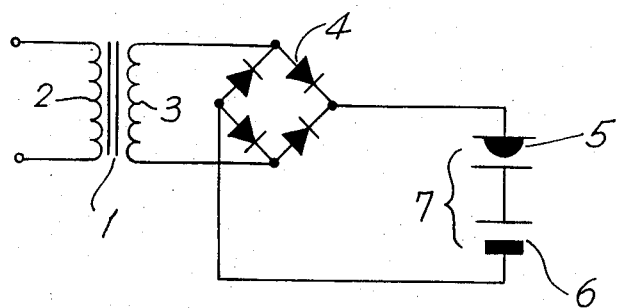
FIG. 2 is a circuit diagram of the fundamental principle of this invention.

FIG. 2 is a circuit diagram showing the principle of a rapid charging method according to this invention. Element 1 is a power-source transformer having a capacitance sufficient to supply the necessary current for rapid charging. Element 2 is the primary winding of the power-source transformer 1. Element 3 is the secondary winding thereof. Element 4 is a rectifier bridge for half-wave or full-wave rectification for the secondary winding of the power-source transformer. Element 5 is the above-mentioned electrolytic cell and element 6 is a Ni-Cd alkali storage battery. The capacitances of the electrolytic cell 5 and the Ni-Cd alkali storage battery 6 are selected to be almost the same. On the assumption that the power-source transformer 1 is an ideal one whose voltage changes only in a limited range, the charging process in such a circuit will be as follows: At the first stage of charging, the proper current necessary to charge rapidly is applied to the charged part 7 which includes, namely, a series connection of the electrolytic cell 5 and the storage battery 6. As the electrolytic cell 5 has a low voltage of 0.1 – 0.25 V from the first stage to the last stage of charging as mentioned above, a uniform high current is applied to the charged part 7, and this condition lasts until the last stage of charging. When charging is completed, the charging current can be lowered because the voltage of the charged part 7 increases to or near that of the power source according to the voltage increase of the electrolytic cell 5. However, the power-source transformer 1 whose voltage changes only in a limited range must be of large size, and so it seldom is actually used. Therefore, stabilization of the power source becomes necessary so that a small-sized transformer whose voltage would otherwise change widely can be used to charge rapidly and certainly.

Figure 3:
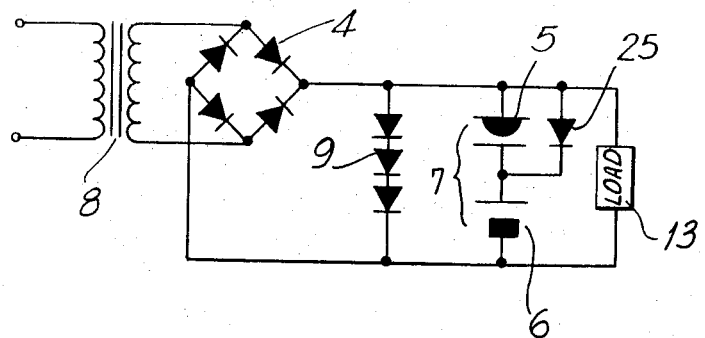
FIG. 3 is a schematic circuit diagram based on FIG. 2 according to one embodiment of the invention.

For example, as shown in FIG. 3, a most effectual method of this invention is one wherein constant voltage is measured utilizing the forward characteristics of several diodes 9 connected in series in a charging circuit which uses a small-sized transformer 8. This method is of low cost and can be utilized easily. Sufficient rapid charging can be obtained according to this method in a circuit construction of this invention. Of course, stabilization of voltage can be realized not only by such a method, but also by other well known stabilizing circuits. It should be noted that the diode 25 in FIG. 3 connected in parallel to the electrolytic cell 5 is a guard dioode for the electrolytic cell 5 and, when the voltage of the electrolytic cell 5 increases, it limits this voltage increase according to the forward voltage of about 0.8 V of the diode.

Figure 4:
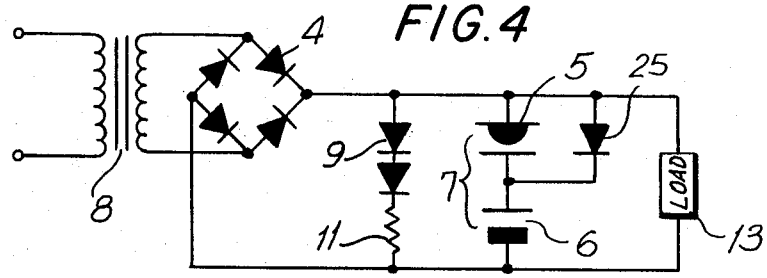
FIG. 4 is a schematic circuit diagram of an improved circuit with respect to the voltage-stabilizing circuit portion of the power source part of FIG. 3.

The following improved method is also conceivable to employ more effectively the above-mentioned method wherein the series connection of several diodes 9 is utilized. If the power-source voltage is stabilized by the series connection of diodes, the charging current of the last stage of charging depends upon the forward voltage of diodes 9 which are connected in series. The charging apparatus according to this invention employing the electrolytic cell 5 can function to regulate the charging current of the last stage by regulating this voltage. However, the regulation is intermittent because the diodes are connected intermittently one by one, and a more effective continuous regulation is not conceivable. On the other hand, as shown in FIG. 4, this invention makes fine regulation of the charging current of the last stage possible by the connecting in series of a resistor 11 possessed of the necessary resistance to the diodes 9 connected in series. According to this improved method, a user of the circuit may select the most desirable current for the last stage of charging as he thinks fit. Also, in designing and manufacturing, the forward voltage of the diodes needs no selection. The stabilized voltage desired in the power-source voltage can be obtained by attaching a resistor 11 possessed of a proper resistance to a suitable diode available in the market. Accordingly, a desirable charging curve including a proper charging current in the last stage of charging can be gained at low cost.

Figure 5:
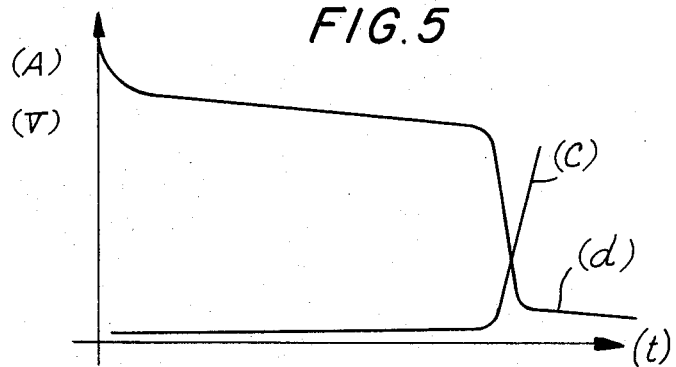
FIG. 5 is a chart which shows the charging curve and voltage change of the electrolytic cell according to the circuit constructions of FIGS. 2, 3 and 4.

As mentioned above, the charging device according to this invention is the most effectual especially for the charging of an enclosed Ni-Cd alkali storage battery, and is constructed in such a way that a current applied to the charged part 7, or the series connection of the electrolytic cell 5 and the storage battery 6, is lowered to zero or to a low value by reducing the electric-potential difference between the charged part 7 and the power source by utilizing the voltage increase of the electrolytic cell at the last stage of charging. The charging characteristic according to the above is shown in FIG. 5. In this figure, the abscissa indicates time, and the ordinate indicates voltage for the electrolytic cell and current for the charging curve. Curve $(c)$ shows the voltage increase of the electrolytic cell, and curve $(d)$ shows the charging curve corresponding to it and the prompt reduction of the charging current according to the voltage increase of the electrolytic cell can be observed.

A new display device is described in the following for displaying the incompletion and/or completion of charging in the event that the voltage of the electrolytic cell 5 increases or the charging current is reduced.

Figure 6:
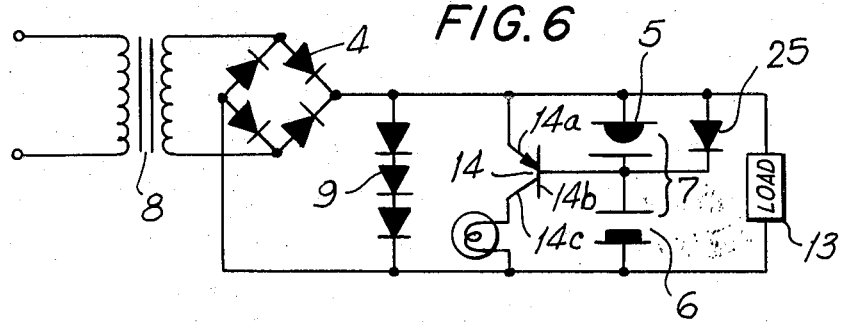
FIGS. 6 and 7 illustrate charging and display circuits which detect increasing voltage of the electrolytic cell.

One embodiment is shown in the circuit of FIG. 6. This circuit is for the last stage of charging or, in other words, the stage of increasing voltage of the electrolytic cell 5. When this increasing voltage is applied between an emitter $14a$ and a base $14b$ of a transistor 14 with base current flowing, this transistor 14 is brought into conductive condition. If a lamp 15, for example, is connected to the collector $14c$ of the transistor 14, the lamp 15 can be lighted on the condition of this increasing voltage. Moreover, the lamp 15 is not lighting during charging because the transistor 14 is non-conductive due to the 0.1 – 0.25 V voltage of the electrolytic cell 5. Thus, the lamp 15 is out during charging and lights at the completion of the charging in this displaying method.

Figure 7:
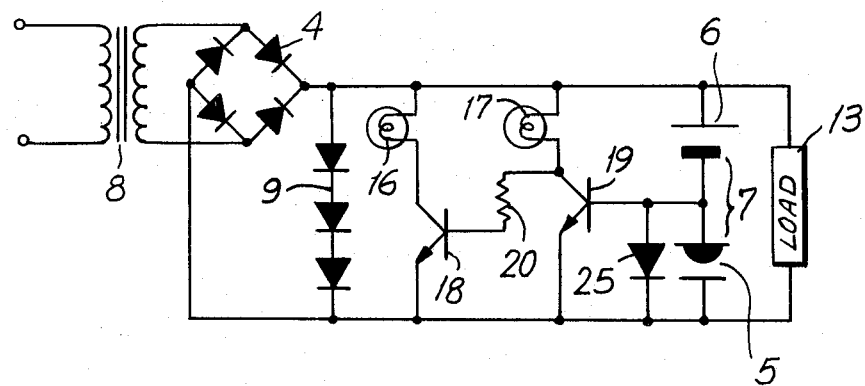

A more complete display circuit can be provided by developing this circuit further as shown in the embodiment of FIG. 7. This circuit consists of a transistor 19 which operates by detecting completion of charging by detecting the increasing voltage of the electrolytic cell 5. A transistor 18 is used which is connected to operate opposite to the conductive and non-conductive conditions of the transistor 19. Lamps 17 and 16 are included which are switched on and off according to the switching operations of transistors 19 and 18. Furthermore, the charged part 7 in this circuit consists of a series connection of an alkali storage battery 6 and an electrolytic cell 5 whose voltage increases at the last stage of charging as mentioned above. As to operating condition of this circuit, the transistor 19 is in non-conductive condition from the first stage of charging to just before the last stage thereof because the voltage of the electrolytic cell 5 is about 0.1 – 0.25 V and it corresponds to the voltage between the base and the emitter of the transistor 19. On the contrary, the transistor 18 is in conductive condition because the voltage between the base and the emitter thereof is nearly equal to the power-source voltage due to the non-conductivity of the transistor 19. As the transistor 19 is non-conductive and the transistor 18 is conductive, the lamp 17 connected thereto in series is out and the lamp 16 is lighted. On the other hand, at the last stage of charging of the storage battery 6 and the electrolytic cell 5 in this condition, the voltage of the electrolytic cell 5 increases to about 0.8 V, and the transistor 19 is brought to conductive condition thereby lighting the lamp 17. When the transistor 19 is brought to conductive condition, the voltage between the base and the emitter of the transistor 18 lowers to almost 0 V, and the transistor 18 is brought to non-conductive condition and thus the lamp 16 is turned off. In other words, the state wherein the lamp 16 is lighting and the lamp 17 is out during charging changes to the reversed state wherein the lamp 17 is lighted and the lamp 16 is out. Thus, a display of incompletion and/or completion of charging can be carried out by utilizing the lamp 16 as a display of incompletion of charging and the lamp 17 as a display of completion of charging. Resistance 20 is a resistance for controlling the base current of the transistor 18.

If a single lamp is used to display the completion of charging, what is desirable in the most effective method is that the lamp is lighted during charging and turned off when charging is complete. For this, the circuit described in the following can be used, taking cost and simplification into consideration as well as the above-mentioned points.

Figure 8:
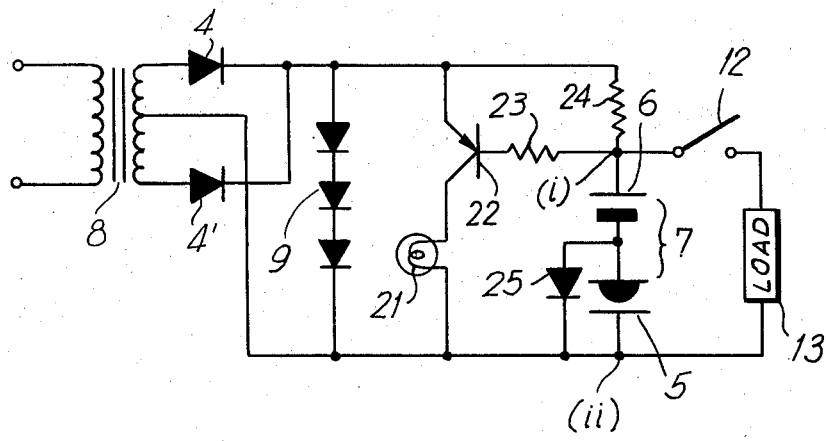
FIG. 8 is a schematic circuit diagram of a charging and display circuit which detect a resistance in accordance with the invention.

Such a circuit is shown in FIG. 8 wherein the charged part is constructed in such a way that a current-detecting resistance 24 is connected in series to the series connection of the alkali storage battery 6 and the electrolytic cell 5. The change of charging current according to the voltage increase of the electrolytic cell 5 is converted into a voltage developing across the current-detecting resistance 24. A lamp 21 connected to a transistor 22 is switched on or off by the switching of the transistor 22 according to the magnitude of this voltage.

The operation of this circuit will next be described in greater detail. Charging current flows from rectifying diodes 4 and 4′ to the resistance 24, the storage battery 6 and the electrolytic cell 5 during the charging operation. Though the electrolytic cell 5 has a low voltage of about 0.1 – 0.25 V of positive polarity at this time, charging is advanced almost regardless of this voltage. A voltage V which is determined by a flowing current A and a resistance R develops across the resistance 24. The voltage developing across the resistance 24 is desirably about 0.5 V in case the transistor 22 which detects this voltage is made of germanium, and about 0.9 V in case of silicon. For example, it is proper that the value of the resistance 24 should be about 1.2 Ω in case the charging current is 400 mA and the transistor is of germanium. In this case, about 0.5 V develops across the resistance 24 during charging and is applied to the emitter and the base of the transistor 22. A base current is applied to the base of the transistor 22 through a resistance 23. The transistor 22 in this case is brought to conductive condition and a lamp 21 connected to the collector is energized and lights. Thus, this display lamp 21 is lighted during charging. On the other hand, at the last stage of charging of the storage battery 6 and the electrolytic cell 5, the voltage of the electrolytic cell 5 increases from about 0.1 – 0.25 V to about 0.8 V, the latter being the value of forward voltage of the guard diode 25. Then the voltage developing across the junctions (i) and (ii) of the circuit of FIG. 8 reaches about 2.3 V together with the battery voltage, approaching the voltage stabilized by the several diodes 9 in parallel connection. The voltage in this embodiment is stabilized at about 2 – 2.4 V by the forward voltage of the three diodes 9. Therefore, the difference between the power-source voltage and the voltage of the charged part including the resistance 24 is reduced, and the charging current is reduced. Accordingly, current flowing through the resistance 24 is reduced and, at the same time, the voltage developed across it is lowered. The base current of the transistor 22 is then reduced, making the transistor 22 non-conductive, and the lamp 21 is turned off because no current is applied to the lamp. Display of completion of charging according to this construction is such that a lamp is lighted during charging and is out when charging is completed.

In FIGS. 3, 4, 6, 7 and 8, element 13 is a load such as a motor, and element 12 is a switch for the load 13.

As mentioned above, the fundamentals of this invention include that:

1. a charged part comprises a Ni-Cd alkali storage battery and an electrolytic cell whose voltage increases at the last stage of charging and which has almost the same or a little larger capacitance than the above-mentioned storage battery; the voltage increase of the electrolytic cell at the last stage of charging reduces the potential difference between the charged part and a power source which applies the charging current, this resulting in a lowering of the charging current applied to the charged part down to zero or to a very low value.

The methods for stabilizing a power source part during charging are improved and they are accompanied by fundamental points of this invention as follows:

2. A charging curve including the charging current at the last stage of charging is regulated by regulating the value of stabilized voltage of the power source part properly on condition that a resistance is connected to a series connection of several diodes.

3. Completion of charging is displayed by utilizing the phenomenon of voltage increase of the above-mentioned electrolytic cell at the last stage of charging in such a way that a lamp is lighted when charging is completed by switching of a transistor or the like which detects the voltage increase.
4. Incompletion of charging and completion time of charging are displayed by using a plurality of switching elements such as transistors which also detect the voltage increase of the electrolytic cell.
5. The charged part comprises the series connection of the electrolytic cell whose voltage increases at the last stage of charging, the Ni-Cd alkali storage battery and a current-detecting resistance, and the display is effected in such a way that a lamp is lighted during charging and is turned off upon completion of charging by a switching element such as a transistor which detects a voltage developed across the above-mentioned current-detecting resistance, or in the reverse way utilizing the operation of a plurality of switching elements, or furthermore both ways can be used together as a display.

This invention is not restricted to the embodiments as shown in the drawings, and many improvements may be added within the scope of the above-mentioned essentials. This invention offers the most suitable charging for a compact portable instrument such as an electric shaver as well as for a Ni-Cd alkali storage battery.

Furthermore, this invention is used to obtain the following advantages:
1. Desirable short-time charging dependent on a charging curve possessed of a ideal characteristic can be obtained because the effects of the voltage increase of the electrolytic cell are remarkable.
2. The number of parts is small and the composition is simple, and short-time charging can be effected with certainty at a moderate cost because the capacity of the transformer is limited to the minimum necessary and no temperature change causes imbalance during charging.
3. The instrument is quite easy to use for a system can be obtained which visually displays completion of charging and/or incompletion of charging at respective times as the occasion demands.

What is claimed is:
1. A charging circuit for an electric shaver, said circuit comprising a power source circuit for transforming and rectifying a supply voltage, said power source circuit including a positive pole and a negative pole; a voltage stabilizing circuit including a plurality of diodes connected in series and each including an anode and a cathode, any one of the anodes of said diodes being connected to said positive pole and one of the cathodes of said diodes being connected to said negative pole; a resistor for detecting output voltage and a secondary battery and a coulometer being connected in series to said voltage stabilizing circuit, a diode connected in parallel to said coulometer, a transistor including a base, an emitter and a collector, a lamp coupled between said collector and said coulometer and one cathode, said emitter being coupled to said one anode, a resistor connecting said base to a junction between the first said resistor and secondary battery and a power source switch for connecting said junction to said shaver.

* * * * *